US012797173B2

(12) United States Patent
Xiong et al.

(10) Patent No.: US 12,797,173 B2
(45) Date of Patent: Nov. 17, 2026

(54) ELECTRIC TOOTHBRUSH HEAD

(71) Applicant: NINGBO AOLBEA ORAL CARE PRODUCTS CO., LTD., Ningbo (CN)

(72) Inventors: Sijun Xiong, Ningbo (CN); Chuke Zheng, Ningbo (CN); Jianli Zheng, Ningbo (CN)

(73) Assignee: NINGBO AOLBEA ORAL CARE PRODUCTS CO., LTD., Ningbo (CN)

( * ) Notice: Subject to any disclaimer, the term of this patent is extended or adjusted under 35 U.S.C. 154(b) by 449 days.

(21) Appl. No.: 18/625,255

(22) Filed: Apr. 3, 2024

(65) Prior Publication Data

US 2025/0017708 A1 Jan. 16, 2025

Related U.S. Application Data

(63) Continuation of application No. PCT/CN2023/113541, filed on Aug. 17, 2023.

(30) Foreign Application Priority Data

Jul. 11, 2023 (CN) ........................ 202310848130.X
Jul. 14, 2023 (CN) ........................ 202310872000.X

(51) Int. Cl.

| | |
|---|---|
| ***A61C 17/22*** | (2006.01) |
| ***A46B 9/04*** | (2006.01) |
| ***A46B 13/00*** | (2006.01) |
| ***A46B 13/02*** | (2006.01) |
| ***A61C 17/34*** | (2006.01) |

(52) U.S. Cl.

CPC .............. *A61C 17/222* (2013.01); *A46B 9/04* (2013.01); *A46B 13/008* (2013.01); *A46B 13/023* (2013.01); *A61C 17/3436* (2013.01)

(58) Field of Classification Search

CPC . A61C 17/222; A61C 17/3436; A46B 13/008; A46B 13/023; A46B 9/04; A46B 13/02; A46B 5/0095

USPC .............................................................. 15/28

See application file for complete search history.

(56) References Cited

FOREIGN PATENT DOCUMENTS

| | | | | |
|---|---|---|---|---|
| CN | 1582134 A | 2/2005 | | |
| CN | 2683063 Y | 3/2005 | | |
| CN | 115281871 A | 11/2022 | | |
| KR | 200365918 Y1 * | 10/2004 | ............. | A46B 13/02 |
| KR | 200378050 Y1 * | 3/2005 | ............. | A46B 13/02 |

* cited by examiner

*Primary Examiner* — Monica S Carter
*Assistant Examiner* — Caleb Andrew Holizna
(74) *Attorney, Agent, or Firm* — Bayramoglu Law Offices LLC

(57) ABSTRACT

An electric toothbrush head includes a brush rod, a swing arm, and a tufted block with bristles; the tufted block is movably and limitingly mounted in the housing cavity of the brush rod; the swing arm is mounted in the mounting chamber of the brush rod and is linked to the tufted block; the bottom of the housing cavity is equipped with a rotating shaft, and the bottom of the tufted block is equipped with a rotating hole; guide protrusions are set on both side walls of the tufted block, and the housing cavity is provided with a mounting slot and a guide groove corresponding to the mounting slot to guide the up, down, left, and right movement of the tufted block. The electric toothbrush head achieves vertical and horizontal movement of the tufted block through the cooperation of the guide protrusions and the guide grooves.

18 Claims, 7 Drawing Sheets

ELECTRIC TOOTHBRUSH HEAD

CROSS REFERENCE TO THE RELATED APPLICATIONS

This application is the Continuation Application of International Application No. PCT/CN2023/113541, filed on Aug. 17, 2023, which is based upon and claims priority to Chinese Patent Application No. 202310848130.X, filed on Jul. 11, 2023, and Chinese Patent Application No. 202310872000.X, filed on Jul. 14, 2023, the entire contents of which are incorporated herein by reference.

TECHNICAL FIELD

The present invention relates to the technical field of toothbrushes, particularly to an electric toothbrush head.

BACKGROUND ART

An electric toothbrush, invented by Philippe-Guy Woog, is a toothbrush that uses rapid rotation or vibration of an electric motor core to produce high-frequency vibrations of the brush head, instantly breaking down toothpaste into fine foam for deep cleaning between teeth. At the same time, the vibration of the bristles can promote blood circulation in the oral cavity and have a massaging effect on the gum tissue.

Existing electric toothbrushes generally include an electric toothbrush handle and an electric toothbrush head used in combination. As shown in FIG. 1, the electric toothbrush head includes a brush rod 100, a swing arm 200, and a tufted block 300 with bristles 310. The brush rod 100 is provided with a housing cavity 110 at its front end, and the housing cavity is equipped with a central shaft 140. The tufted block 300 is mounted in the housing cavity 110 and is provided with a mating hole 330 that cooperates with the central shaft 140 to swing left and right. At the same time, a rivet 500 is provided between the tufted block 300 and the housing cavity 110 to prevent the tufted block from detaching; the brush rod 100 also has a mounting chamber 120 extending from the rear end to the front and communicating with the housing cavity 110. The swing arm 200 is mounted in the mounting chamber 120 and is connected to the tufted block 300 through a drive shaft 220. Thus, the swing arm 200 can move under the drive of the driving device in the electric toothbrush handle to drive the tufted block 300 to swing left and right along the central shaft. However, the existing electric toothbrush head's tufted block 300 can only swing left and right due to the limitation of the rivet 500. At the same time, the stability of the tufted block's rotation restricted by the rivet and the central shaft is poor, resulting in a poor cleaning effect. Generally, it can only clean the surface of the teeth and is difficult to remove foreign objects from between the teeth. Furthermore, the rivet of the existing electric toothbrush head is directly exposed on the outside without any cover. Once the rivet becomes loose, it may fall into the user's oral cavity, and even cause the user to swallow the rivet into the stomach, posing a danger. There is room for improvement.

SUMMARY OF THE INVENTION

The present invention aims to overcome the defects of the existing technology and provide an electric toothbrush head with a simple and reasonable structure. By the cooperation of the guide protrusions and the guide grooves, the tufted block can move up and down while swinging left and right.

During the brushing process, the left and right swinging of the tufted block can achieve up and down brushing, and at the same time, the up and down movement of the tufted block can apply a gentle vertical impact force on the tooth surface, allowing the bristles to better penetrate into the gaps between teeth and move in and out along the gaps to push out the residues in the gaps, thus improving the cleaning effect of the toothbrush head. At the same time, the tufted block can be easily inserted into the housing cavity of the brush rod through the mounting slot and the guide protrusions can be snapped into the corresponding guide grooves. Furthermore, by defining the position of the mounting slot on the housing cavity and limiting the swing angle through the cooperation of the drive shaft and the swinging slot, the movement of the guide protrusions within the guide grooves is ensured, guaranteeing the reliability and stability of the movement of the tufted block.

To achieve the above objectives, the present invention provides an electric toothbrush head for use with an electric toothbrush handle, including a brush rod, a swing arm, and a tufted block with bristles; wherein the brush rod has a first central axis, the brush rod is provided with a housing cavity on the upper surface of its front end portion, and the brush rod is provided with a mounting chamber extending from the rear end portion to the front and communicating with the housing cavity along the first central axis; the tufted block is movably and limitingly mounted in the housing cavity of the brush rod, the tufted block has a second central axis and is centered by aligning the second central axis parallel or collinear with the first central axis; the swing arm is mounted in the mounting chamber of the brush rod and is connected to the tufted block in a linked manner;

The brush rod is provided with a vertically extending rotating shaft at the middle of the bottom of the housing cavity, and the bottom of the tufted block is correspondingly provided with a rotating hole that cooperates with the rotating shaft to allow rotation around the axis;

The tufted block has at least one guide protrusion on the side walls on both sides of the second central axis, the opening of the housing cavity is provided with a mounting slot corresponding to the guide protrusion after the tufted block is deflected at least a first angle from the first central axis, and the inner wall of the housing cavity is also provided with a guide groove corresponding to the mounting slot and communicating with it for the guide protrusion to slide into to guide the tufted block to move up, down, left, and right, the guide grooves on both sides of the first central axis on the housing cavity are arranged to extend in opposite directions;

The rear end portion of the tufted block is provided with a swinging slot, the front end portion of the swing arm is provided with a drive shaft extending into the swinging slot, and the drive shaft drives the tufted block to swing left and right by contacting the opposite inner walls of the swinging slot, and the maximum deflection angle of the swing arm driving the tufted block to swing on one side is less than the first angle.

It is further provided that the amplitude of the tufted block moving up and down along the guide groove is 0.1 mm-2 mm.

It is further provided that the bottom wall of the mounting chamber is provided with a limiting rib, the top of the limiting rib is spaced from the top wall of the mounting chamber to form a through channel;

The front end portion of the swing arm abuts against the limiting rib and is provided with a positioning pivot at the corresponding abutting position, and the limiting rib is correspondingly provided with a positioning hole that cooperates with the positioning pivot to allow the swing arm to swing left and right around the axis;

The drive shaft of the swing arm is arranged corresponding to the through channel and is connected to the tufted block through the through channel.

It is further provided that the swing arm is symmetrically provided with elastic reset components on both sides of its front end portion, and the elastic reset components on both sides always have a tendency to rotate towards the center to achieve movement towards the center.

It is further provided that the elastic reset components on both sides of the swing arm are part of an integral balance spring, the balance spring includes spring sections on both sides and a connecting part connecting the two spring sections.

It is further provided that the swing arm is provided on both sides of its front end portion with notches for embedding the spring sections and recesses extending from the front end of the swing arm to the rear to guide both sides of the notches for embedding the connecting part.

It is further provided that the front end face of the swing arm is provided with an anti-rotation slot, and the tail of the drive shaft has a step;

When the drive shaft is fixedly inserted into the anti-rotation slot of the swing arm, the step is constructed to press against the connecting part of the balance spring.

It is further provided that the swing arm is correspondingly provided with an exhaust hole connected to the rear end of the anti-rotation slot, and the extension axis of the exhaust hole is parallel or perpendicular to the extension axis of the anti-rotation slot.

It is further provided that both sides of the notch are provided with positioning posts that cooperate with the inner holes of the spring sections.

It is further provided that the elastic reset components on both sides are fixedly connected with balancing members, and the opposite side walls of the mounting chamber are correspondingly provided with guide fixing grooves for embedding the balancing members.

It is further provided that the guide fixing groove is provided with a balance member rib corresponding to the front slot wall, the balance member rib and the front end of the guide fixing groove cooperate to form a limiting placement area for limiting the placement of the balance member, the front wall surface of the balance member rib is tangent to the outer surface of the balance member, and its rear wall surface is a sloped or curved structure for guiding the balance member to slide in.

It is further provided that the front end portion of the drive shaft is provided with a bent segment arranged in the swinging slot, and the tufted block is driven to swing left and right by the bent segment contacting the corresponding opposite inner walls of the swinging slot.

It is further provided that it also includes a fixation sleeve, the fixation sleeve is fixedly mounted inside the rear end portion of the mounting chamber to lock the swing arm in place within the mounting chamber.

It is further provided that the cross-sectional shape of the guide protrusion is circular, elliptical, triangular, or trapezoidal.

It is further provided that the guide groove is helical, sloped, or arc-shaped.

It is further provided that the guide protrusion is integrally connected to the tufted block, or the guide protrusion is a separate component mounted on the tufted block.

Compared with the existing technology, the present invention has a simple and reasonable structure and has the following advantages:

By the cooperation of the guide protrusions and the guide grooves, the tufted block can move up and down in the vertical direction while swinging left and right in the horizontal direction. During the brushing process, the left and right swinging of the tufted block can achieve up and down brushing, and at the same time, the up and down movement of the tufted block can apply a gentle vertical impact force on the tooth surface, allowing the bristles to better penetrate into the gaps between teeth and move in and out along the gaps to push out the residues in the gaps, thus improving the cleaning effect of the toothbrush head;

The tufted block can be easily inserted into the housing cavity of the brush rod through the mounting slot and the guide protrusions can be snapped into the corresponding guide grooves;

By defining the position of the mounting slot on the housing cavity and limiting the swing angle through the cooperation of the drive shaft and the swinging slot, the movement of the guide protrusions within the guide grooves is ensured, guaranteeing the reliability and stability of the movement of the tufted block;

The symmetrically arranged elastic reset components on both sides of the swing arm not only have a buffering effect to reduce noise during operation but also enable the swing arm to automatically center itself, ensuring that the extension axes of the tufted block and the brush rod are always on the same line or parallel lines, maintaining the overall aesthetics and consistency of the electric toothbrush head.

LIST OF REFERENCE NUMERALS

Figure 1:
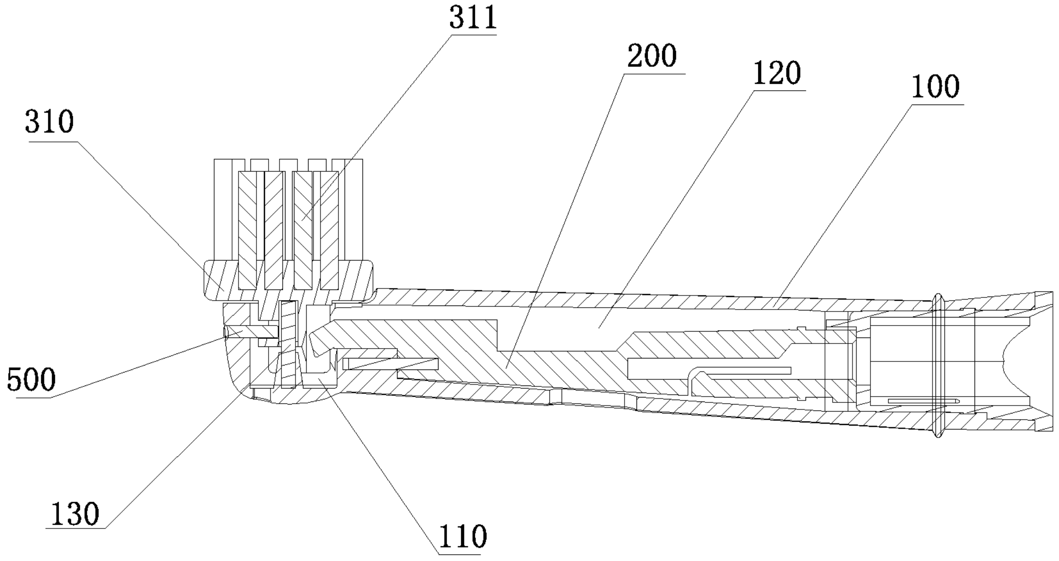
FIG. 1 (Prior Art)
FIG. 1 is a schematic axial sectional view of an existing electric toothbrush head.

100, brush rod; 110, housing cavity; 111, mounting slot; 112, guide groove; 120, mounting chamber; 121, guide fixing groove; 1211, balance member rib; 130, rotating shaft; 140, limiting rib; 141, positioning hole; 142, through channel; 200, swing arm; 210, positioning pivot; 220, drive shaft; 221, bent segment; 222, step; 230, notch; 240, recess; 250, positioning post; 260, anti-rotation slot; 270, exhaust hole; 300, tufted block; 310, face support; 311, bristles; 320, rotating base; 321, guide protrusion; 322, rotating hole; 323, swinging slot; 400, fixation sleeve; 500, rivet; 600, balance spring; 610, spring section; 620, connecting part; 630, balancing member; A, first central axis; B, second central axis; C, first angle.

DETAILED DESCRIPTION OF THE EMBODIMENTS

The following is a detailed description of a specific embodiment of the present invention in conjunction with the accompanying drawings, but it should be understood that the scope of protection of the present invention is not limited by the specific embodiment.

An electric toothbrush head of the present invention, as shown in FIGS. 4 to 8, is used in conjunction with an electric toothbrush handle, which provides the necessary power for the operation of the electric toothbrush head; the electric toothbrush head includes a brush rod 100, a swing arm 200, a fixation sleeve 400, and a tufted block 300 with bristles 311. The tufted block 300 is correspondingly mounted on the front end portion of the brush rod 100, the swing arm 200 is mounted inside the brush rod 100 and the front end portion of the swing arm 200 is connected to the tufted block 300, and the fixation sleeve 400 is fixedly mounted inside the brush rod 100 to lock the swing arm 200 in place within the brush rod 100 to prevent it from detaching; thus, when the electric toothbrush head is used in conjunction with the electric toothbrush handle, the swing arm 200 can move under the drive of the driving device in the electric toothbrush handle to drive the tufted block 300 to swing left and right to achieve an automatic up and down brushing effect.

Figure 8:
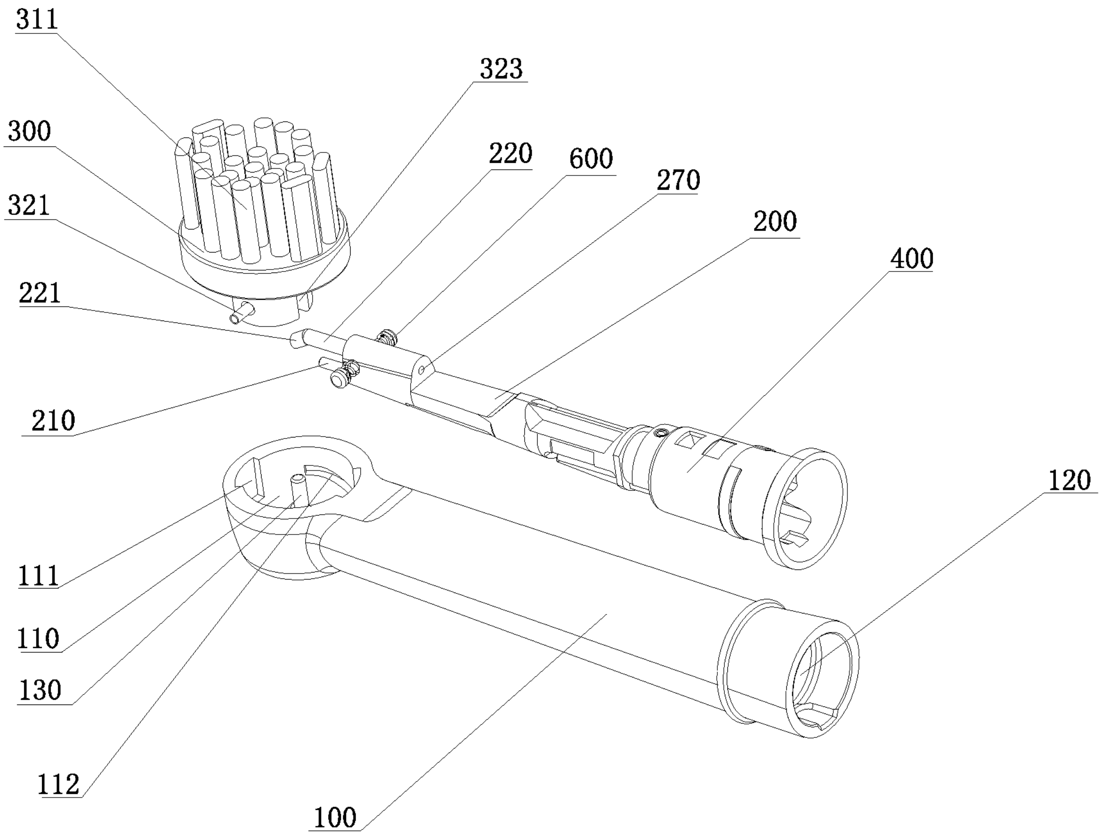
FIG. 8 is a schematic view of the separated structure of the electric toothbrush head of the present invention.

In this embodiment, as shown in FIG. 8, the tufted block 300 includes a face support 310 with bristles 311 and a rotating base 320 fixedly connected to the lower surface of the face support 310; the tufted block 300 has a second central axis B, and the rotating base 320 is provided with oppositely arranged guide protrusions 321 on the side walls corresponding to the second central axis B. The guide protrusions 321 on both sides can be integrally connected parts of the rotating base 320 or separate components mounted on the rotating base 320 later. At the same time, the cross-sectional shape of the guide protrusions 321 can be circular, elliptical, triangular, or trapezoidal, etc.; the rotating base 320 is provided with a rotating hole 322 with a certain depth at the middle of its bottom, and the rotating base 320 is provided with a swinging slot 323 at its rear end face to achieve linkage with the swing arm 200.

Figure 4:
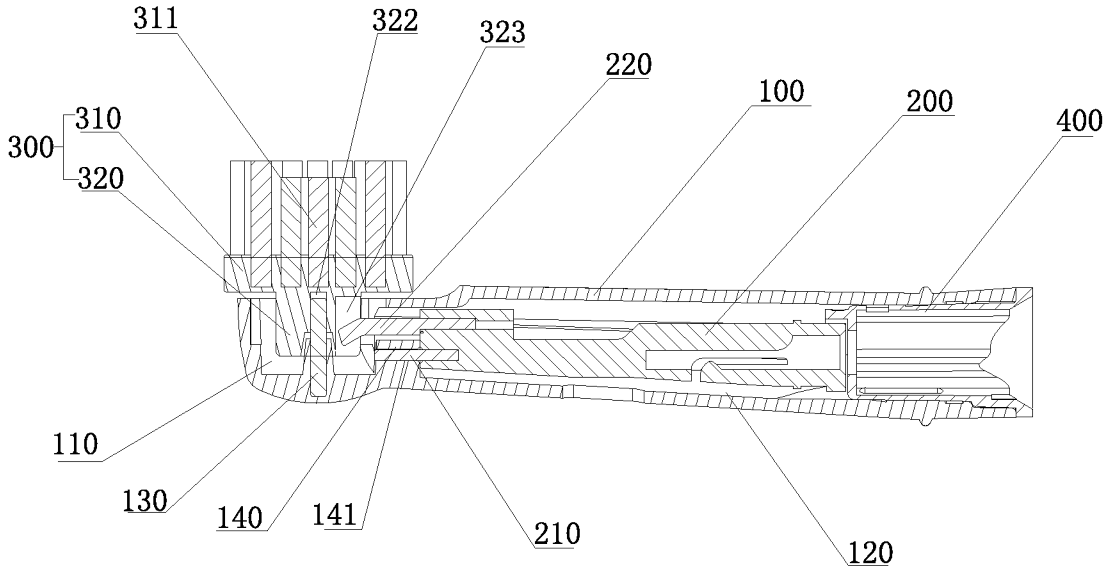
FIG. 4 is a schematic axial sectional view of the electric toothbrush head of the present invention.
Figure 5:
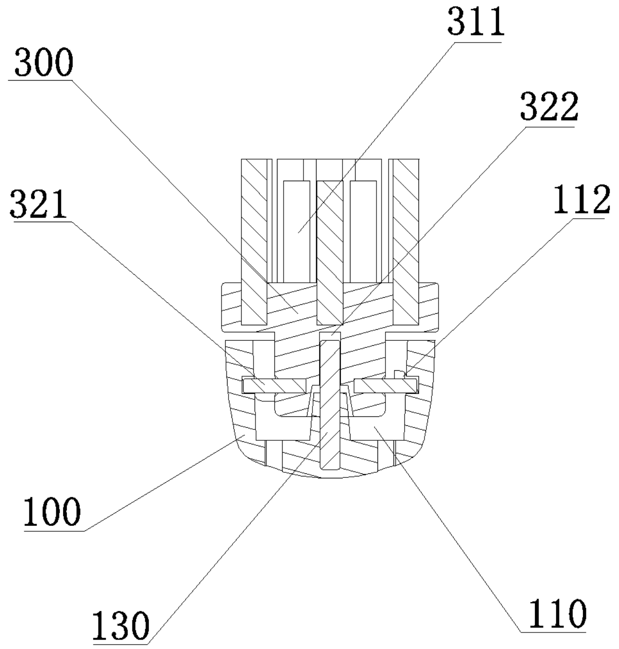
FIG. 5 is a schematic sectional view of the tufted block corresponding to the electric toothbrush head of the present invention.
Figure 12:
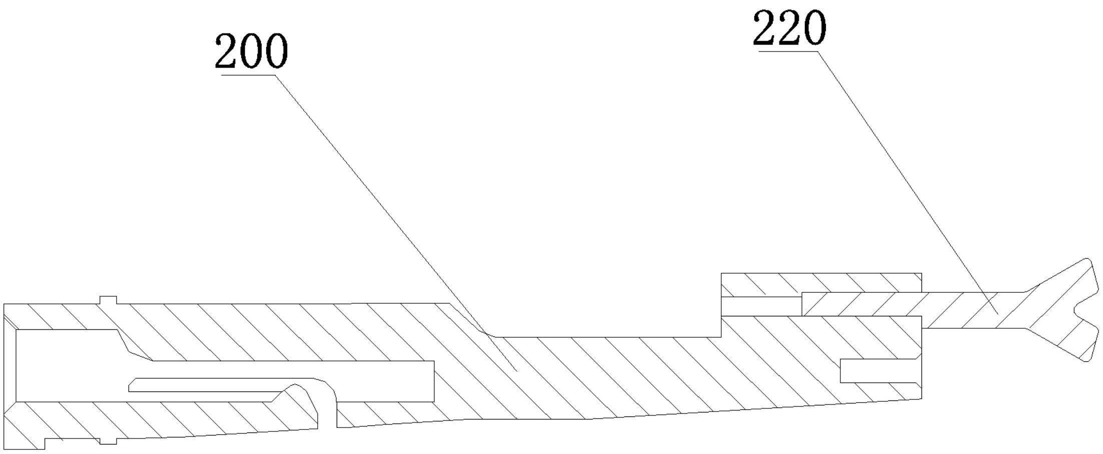
FIG. 12 is a schematic view of a specific implementation structure of the drive shaft corresponding to the swing arm one.
Figure 13:
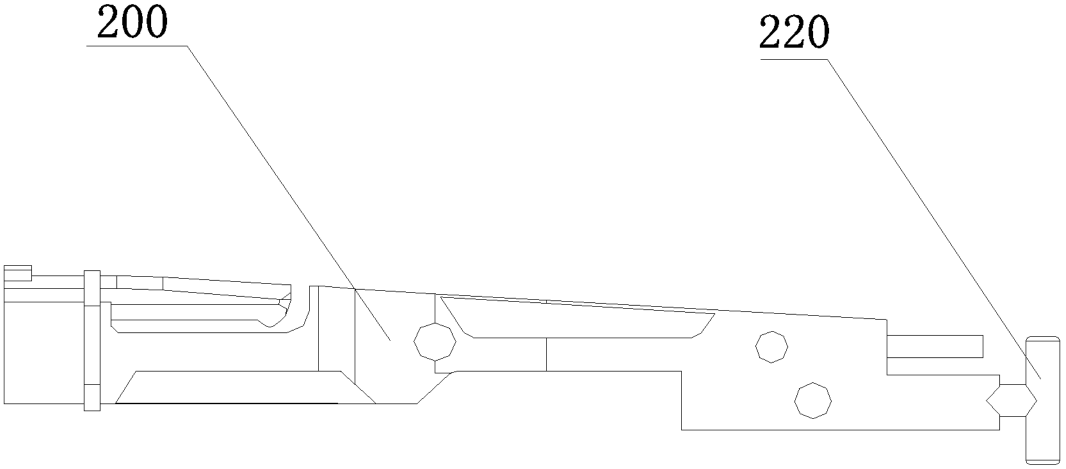
FIG. 13 is a schematic view of a specific implementation structure of the drive shaft corresponding to the swing arm two.

In this embodiment, as shown in FIGS. 4 and 8, the swing arm 200 is provided with a drive shaft 220 extending forward at its front end portion, and the front end portion of the drive shaft 220 is provided with a bent segment 221 arranged in a bent manner. The bent segment 221 extends into the swinging slot 323 of the rotating base 320, and the swing arm 200 swings under the action of the driving device in the electric toothbrush handle to drive the bent segment 221 of the drive shaft 220 to act on the opposite inner walls of the swinging slot 323 to make the tufted block 300 swing left and right. By controlling the bending degree of the bent segment 221 of the drive shaft 220, the swinging amplitude of the tufted block 300 can be controlled; the specific structure of the drive shaft 220 (bent segment 221) of this patent is shown in FIGS. 8, 12, and 13, which can be a 7-shaped structure, Y-shaped structure, T-shaped structure, and other shapes that can drive the tufted block to swing left and right.

In this embodiment, as shown in FIGS. 4, 5, 7, 8, 10, and 11, the brush rod 100 has a first central axis A arranged along its rod body, and the brush rod 100 is provided with a housing cavity 110 at its front end portion for accommodating the rotating base 320 of the tufted block 300. The bottom of the housing cavity is correspondingly provided with a vertically extending rotating shaft 130 for insertion into the rotating hole 322 of the rotating base 320. The rotating shaft 130 and the rotating hole 322 cooperate to allow the tufted block 300 to rotate at a fixed point. At the same time, the housing cavity 110 is provided with a mounting slot 111 at its opening corresponding to the guide protrusions 321, which guides the rotating base 320 and its guide protrusions 321 to be inserted into the housing cavity 110 from top to bottom. At the same time, the inner wall of the housing cavity 110 is also provided with a guide groove 112 corresponding to the mounting slot 111 and communicating with it for cooperating with the guide protrusions 321 to guide the tufted block 300 to move left, right, up, and down. The guide groove 112 is preferably helical, sloped, or arc-shaped and guides the tufted block 300 to move up and down with an amplitude preferably of 0.1 mm-2 mm. The opening of the guide groove 112 is preferably connected to the bottom of the mounting slot 111 to facilitate the screwing in of the guide protrusions 321. The guide grooves 112 on both sides of the first central axis A extend in opposite directions, i.e., one side of the guide groove 112 extends forward and upward from the starting position, while the other side extends backward and downward from the starting position, or vice versa. At the same time, the brush rod 100 is provided with a mounting chamber 120 extending from the rear end portion to the front along the first central axis A for mounting the swing arm 200. The front end bottom wall of the mounting chamber 120 is provided with a protruding limiting rib 140, and the top of the limiting rib 140 is spaced from the top wall of the mounting chamber 120 to form a through channel 142 connecting the mounting chamber 120 with the housing cavity 110.

Figure 10:
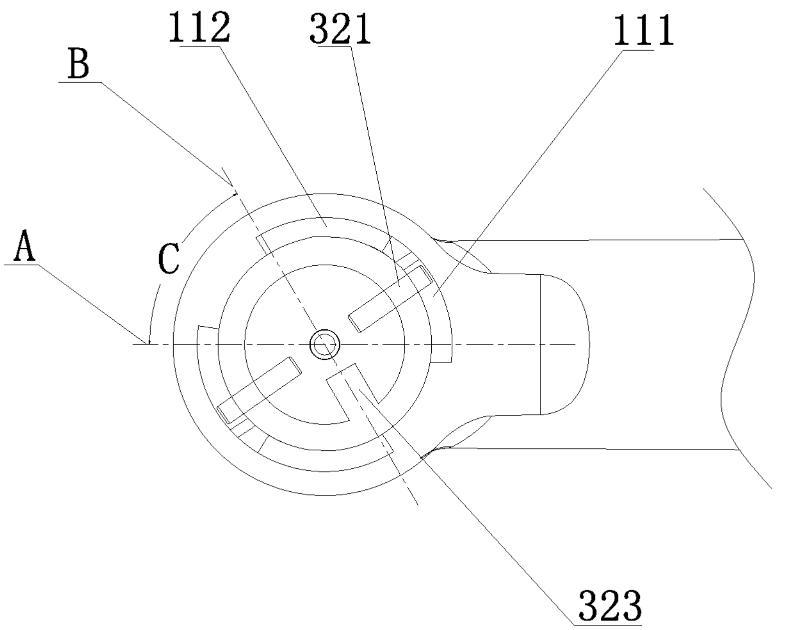
FIG. 10 is a schematic plan view of the tufted block during installation.
Figure 11:
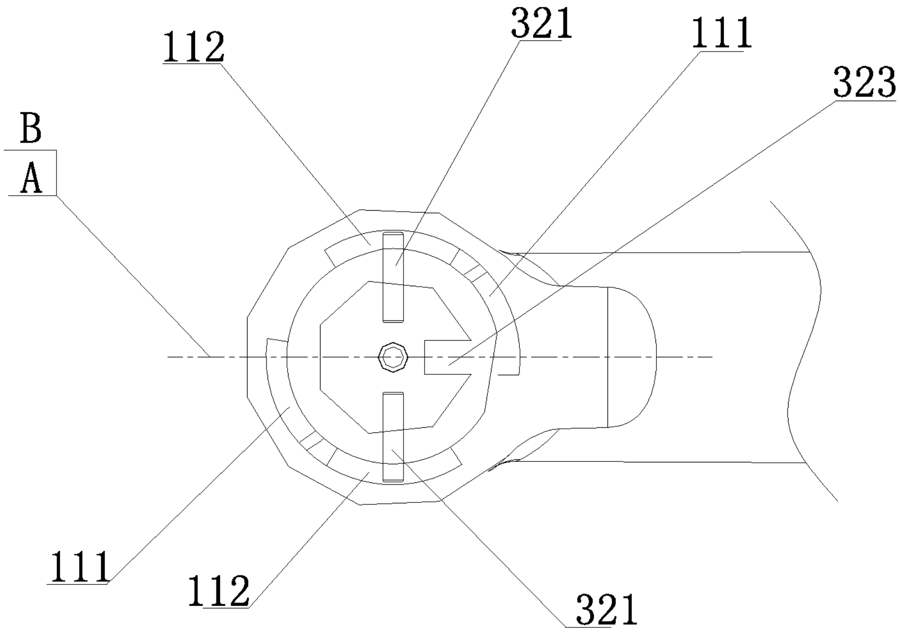
FIG. 11 is a schematic plan view after the tufted block is installed in place.

During installation, the guide protrusions 321 of the tufted block 300 are aligned with the mounting slots 111 of the housing cavity 110, at which time the second central axis B of the tufted block 300 is arranged at a first angle C with the first central axis A of the brush rod 100 and the rotating hole 322 is directly opposite the rotating shaft 130 (as shown in FIG. 10), thus facilitating the insertion of the rotating base 320 of the tufted block 300 into the housing cavity 110. Then, the tufted block 300 is rotated so that the guide protrusions 321 enter the guide groove 112 and are rotated to the initial position, that is, the second central axis B of the tufted block 300 is collinear or parallel with the first central axis A of the brush rod 100 (as shown in FIG. 11), at which point the swinging slot 323 of the tufted block 300 is arranged to face backward. The swing arm 200 is inserted into the mounting chamber 120 of the brush rod 100 from the rear end until its front end abuts against the limiting rib 140, and the drive shaft 220 of the swing arm 200 passes through the through channel and extends into the swinging slot 323 of the tufted block 300, thus providing positioning and limiting constraints to the tufted block 300. Thus, by controlling the maximum single-side swing angle of the swing arm 200 driving the tufted block 300 to be less than the first angle C when the tufted block 300 is installed, the movement of the guide protrusions 321 within the guide groove 112 is ensured, thus guaranteeing the working stability of the tufted block 300.

In the above scheme, as shown in FIG. 4, the swing arm 200 is mounted in the mounting chamber 120 of the brush rod 100 and its front end abuts against the limiting rib 140. The front end of the swing arm 200 is provided with a positioning pivot 210 at the corresponding position of the limiting rib 140, and the limiting rib 140 is correspondingly provided with a positioning hole 141 for the positioning pivot 210 to pass through, thus allowing the swing arm 200 to rotate under the drive of the driving device along the positioning pivot 210, thereby ensuring the stability and reliability of the movement of the swing arm 200. Further, the fixation sleeve 400 is fixedly mounted inside the rear end portion of the mounting chamber 120 by means of a convex-concave snap connection and cooperates with the limiting rib 140 to lock the swing arm 200 in place within the mounting chamber 120.

Figure 2:
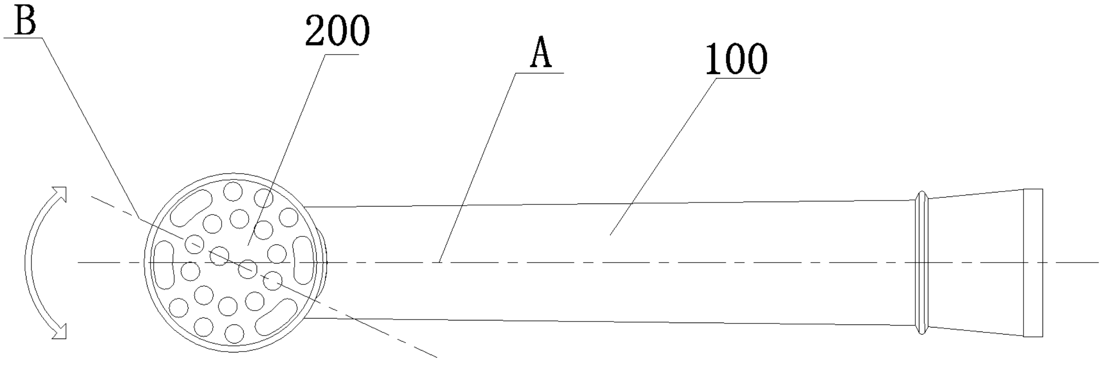
FIG. 2 (Prior Art)
FIG. 2 is a schematic view of the existing electric toothbrush head in a non-centered state.
Figure 3:
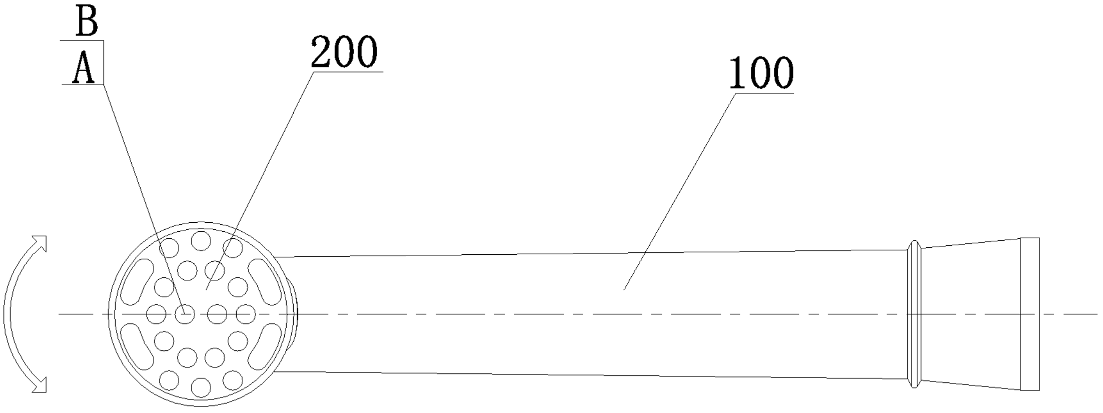
FIG. 3 is a schematic view of the electric toothbrush head of the present invention in a centered state.
Figure 6:
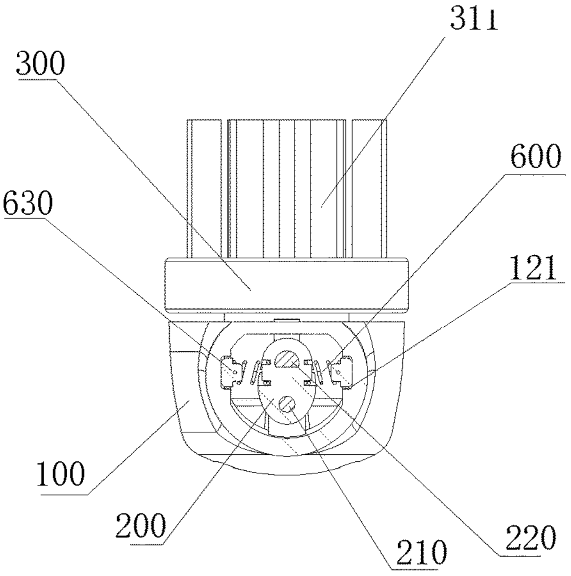
FIG. 6 is a schematic sectional view of the reset elastic component corresponding to the electric toothbrush head of the present invention.
Figure 9:
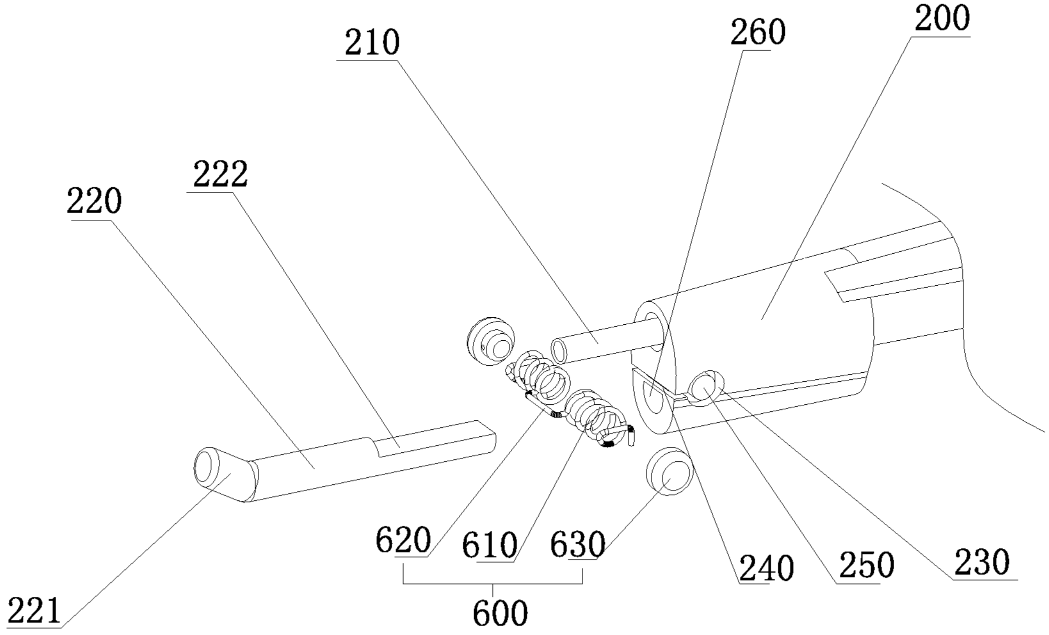
FIG. 9 is a further separated schematic view of the front end portion of the swing arm in FIG. 8.

In this embodiment, as shown in FIGS. 6, 8, and 9, the swing arm 200 is also symmetrically provided with elastic reset components on both sides of its front end. The symmetrically arranged elastic reset components not only have a buffering effect to reduce noise during the operation of the swing arm 200 but also enable the swing arm 200 to automatically center itself, ensuring that the swing arm 200 automatically rotates towards the center when the driving device stops working, thus keeping the extension axes of the tufted block 300 and the brush rod 100 always on the same line or parallel lines (as shown in FIG. 3), maintaining the overall aesthetics and consistency of the electric toothbrush head. The elastic reset components enable the swing arm 200 to automatically center itself, effectively solving the problem of the uncontrollable stop position of the existing electric toothbrush head's swing arm 200, that is, the swing arm 200 will stay at any reachable position, causing the tufted block 300 and the brush rod 100 to often be in a non-centered state (as shown in FIG. 2), that is, there is an angle between the second central axis B of the tufted block 300 and the first central axis A of the brush rod 100, and the degree of this angle is less than the first angle C. The non-centered state seriously damages the overall aesthetics and consistency of the electric toothbrush head and significantly affects the buyer's desire to purchase.

In the above scheme, as shown in FIGS. 6, 8, and 9, the symmetrically arranged elastic reset components are part of an integral balance spring 600. The balance spring 600 includes spring sections 610 on both sides and a connecting part 620 that integrally connects the two spring sections 610, with the spring sections 610 being the aforementioned elastic reset components. In some other specific embodiments, the elastic reset components on both sides can also be independently used springs or other elastic components, such as spring plates, elastomers, etc. In this embodiment, the specific mounting structure of the balance spring 600 on the swing arm 200 is as follows: the swing arm 200 is provided on both sides of its front end portion with notches 230 for the entire spring sections 610 to be embedded and recesses 240 extending from the front end of the swing arm 200 to the rear to guide both sides of the notches 230 for embedding the connecting part 620. The notches 230 on both sides are also provided with positioning posts 250 that cooperate with the inner holes of the spring sections 610. Further preferably, the front end face of the swing arm 200 is provided with an anti-rotation slot 260 for the drive shaft 220 to be fixedly inserted, and the tail of the drive shaft 220 has a step structure 222. When the drive shaft 220 is fixedly inserted into the anti-rotation slot 260 of the swing arm 200, the step structure 222 is constructed to press against the connecting part 620 of the balance spring 600, thus improving the reliability of the installation of the balance spring 600 on the swing arm 200 and preventing it from detaching.

Figure 14:
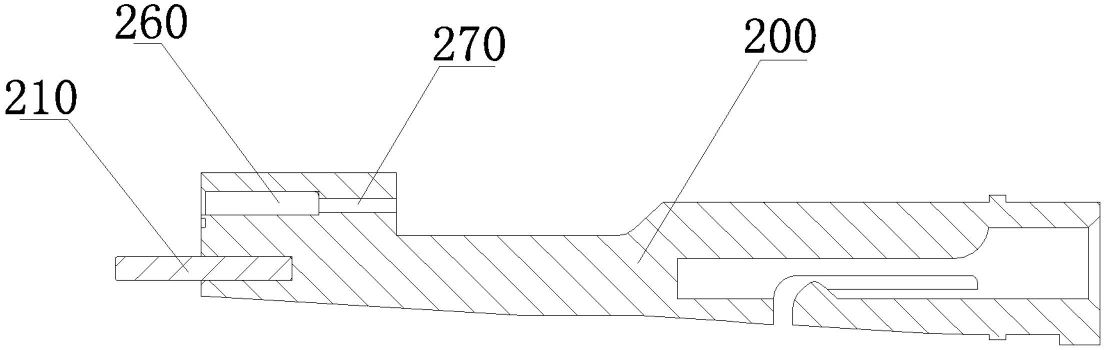
FIG. 14 is a schematic view of a specific implementation structure of the anti-rotation slot corresponding to the swing arm one.
Figure 15:
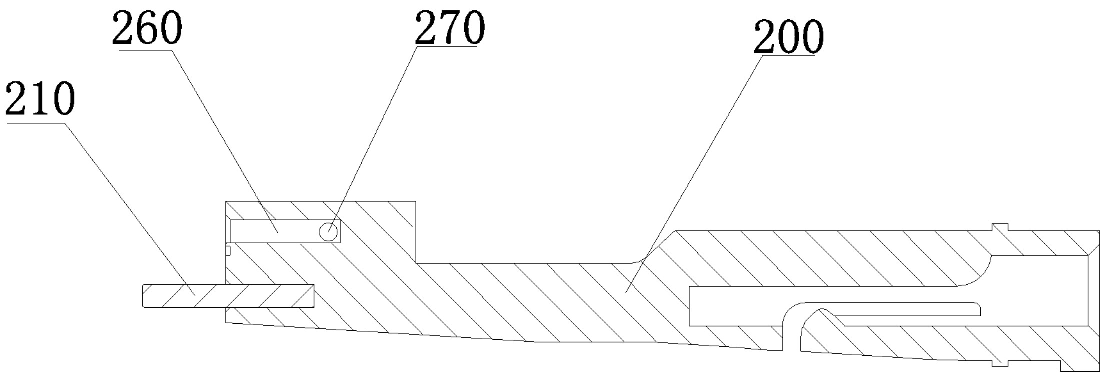
FIG. 15 is a schematic view of a specific implementation structure of the anti-rotation slot corresponding to the swing arm two.

In the above scheme, to facilitate the insertion of the drive shaft 220, as shown in FIGS. 14 and 15, the swing arm 200 is provided with an exhaust hole 270 connected to the rear end of the anti-rotation slot 260. The extension axis of the exhaust hole 270 is parallel or perpendicular to the extension axis of the anti-rotation slot 260.

Figure 7:
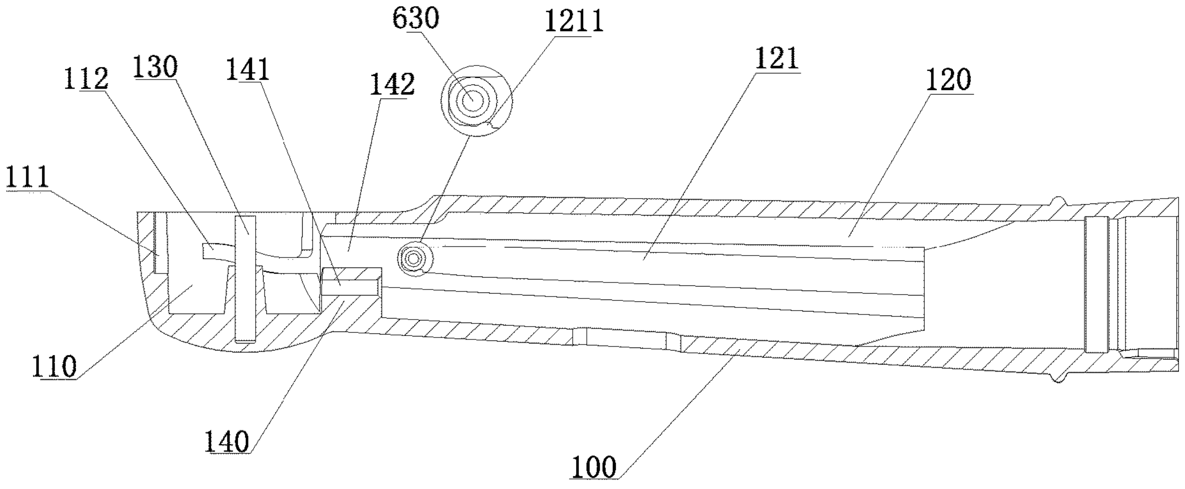
FIG. 7 is a schematic axial sectional view of the brush rod of the present invention.

In this embodiment, as shown in FIGS. 6, 7, and 9, the balance spring 600 has balancing members 630 hooked to the spring sections 610 on both sides. The sidewalls of the mounting chamber are correspondingly provided with guide fixing grooves for the insertion of the balancing members 630. The cooperation between the balancing members 630 and the guide fixing grooves plays a role in positioning and guiding to facilitate the overall installation of the swing arm 200; the guide fixing grooves are provided at the front end of their slot walls with balance member ribs 1211 for the balancing members 630. These balance member ribs 1211, in conjunction with the front end of the guide fixing grooves, form a limiting housing area for the positioning of the balancing members 630. The front wall surface of the balance member rib 1211 is adapted to (tangent to) the outer surface of the balancing member 630, and its rear wall surface is a sloped or arcuate structure for guiding the balancing member 630 to slide in. Once installed, the balancing member 630 is constrained within the limiting housing area, restricting the movement of the balancing member 630 and effectively reducing noise.

In some other specific embodiments, two or more guide protrusions 321 can also be set on the tufted block 300, that is, at least one guide protrusion 321 is set on the sidewalls of the tufted block 300 on both sides of the second central axis B.

In some other specific embodiments, guide grooves 112 can also be set on the tufted block 300, and corresponding guide protrusions 321 are set on the inner wall of the housing cavity 110, to achieve the cooperation of the two for movement in all directions.

Figure 16:
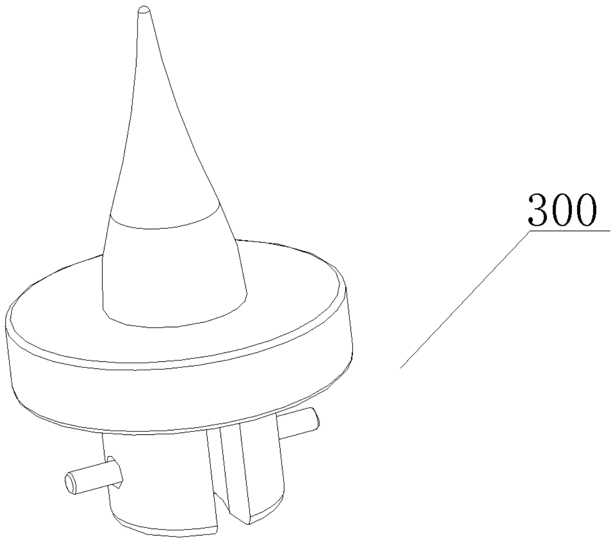
FIG. 16 is a schematic view of another specific implementation structure of the tufted block.

In some other specific embodiments, as shown in FIG. 16, the bristles on the tufted block can also be selected and replaced with soft rubber spikes for massaging the gums.

Compared with the prior art, the structure of the present invention is simple and reasonable, with the following advantages:

By the cooperation of the guide protrusions and the guide grooves, the tufted block can swing left and right in the horizontal direction while also being able to move up and down in the vertical direction. During the brushing process, the left and right swinging of the tufted block can achieve up and down brushing, and the up and down movement of the tufted block can apply a vertical gentle impact force on the tooth surface, allowing the bristles to better penetrate into the gaps between teeth and move in and out along the gaps to push out the residues in the gaps, thus improving the cleaning effect of the toothbrush head;

The tufted block can be easily inserted into the housing cavity of the brush rod through the mounting slot and the guide protrusions can be snapped into the corresponding guide grooves;

By limiting the position of the mounting slot on the housing cavity and coordinating the drive shaft with the swinging slot to limit the swinging angle, it ensures that the guide protrusions move within the guide grooves, guaranteeing the reliability and stability of the movement of the tufted block;

The elastic reset components symmetrically arranged on both sides of the swing arm not only have a buffering effect to reduce noise but also enable the swing arm to have an automatic centering function, ensuring that the extension axis of the tufted block and the brush rod are always on the same line or parallel lines, ensuring the overall aesthetic and consistency of the electric toothbrush head.

The above disclosure is only an embodiment of the present invention, but the invention is not limited to this. Any variations that can be conceived by those skilled in the art should fall within the scope of protection of the present invention.

The invention claimed is:

1. An electric toothbrush head for use with an electric toothbrush handle, comprising a brush rod, a swing arm, and a tufted block with bristles; wherein the brush rod has a first central axis, the brush rod is provided with a housing cavity on an upper surface of a front end portion of the brush rod, and the brush rod is provided with a mounting chamber extending from a rear end portion to the front end portion and communicating with the housing cavity along the first central axis; the tufted block is movably and limitingly mounted in the housing cavity of the brush rod, the tufted block has a second central axis and is centered by aligning the second central axis parallel or collinear with the first central axis; the swing arm is mounted in the mounting chamber of the brush rod and is connected to the tufted block in a linked manner;

the brush rod is provided with a rotating shaft vertically extending at a middle of a bottom of the housing cavity, and a bottom of the tufted block is correspondingly provided with a rotating hole cooperating with the rotating shaft to allow rotation around the rotating shaft;

the tufted block has at least one guide protrusion the side walls on two sides of the second central axis, an opening of the housing cavity is provided with a mounting slot corresponding to the at least one guide protrusion after the tufted block is deflected at least a first angle from the first central axis, and an inner wall of the housing cavity is provided with a guide groove corresponding to the mounting slot and communicating with the mounting slot, the at least one guide protrusion slides into the guide groove to guide the tufted block to move up, down, left, and right; guide grooves on two sides of the first central axis on the housing cavity are arranged to extend in opposite directions when two or more guide protrusions are provided;

a rear end portion of the tufted block is provided with a swinging slot, a front end portion of the swing arm is provided with a drive shaft extending into the swinging slot, and the drive shaft drives the tufted block to swing left and right by contacting opposite inner walls of the swinging slot, and a maximum deflection angle of the swing arm driving the tufted block to swing on one side is less than the first angle.

2. The electric toothbrush head according to claim 1, wherein an amplitude of the tufted block moving up and down along the guide groove is 0.1 mm-2 mm.

3. The electric toothbrush head according to claim 1, wherein a bottom wall of the mounting chamber is provided with a limiting rib, a top of the limiting rib is spaced from a top wall of the mounting chamber to form a through channel;

the front end portion of the swing arm abuts against the limiting rib and is provided with a positioning pivot at a corresponding abutting position, and the limiting rib is correspondingly provided with a positioning hole cooperating with the positioning pivot to allow the swing arm to swing left and right around the positioning pivot;

the drive shaft of the swing arm is arranged corresponding to the through channel and is connected to the tufted block through the through channel.

4. The electric toothbrush head according to claim 3, wherein the swing arm is symmetrically provided with elastic reset components on two sides of the front end portion of the swing arm, and the elastic reset components on two sides always have a tendency to rotate towards a center to achieve movement towards the center.

5. The electric toothbrush head according to claim 4, wherein the elastic reset components on the two sides of the swing arm are a part of an integral balance spring, the integral balance spring includes spring sections on two sides and a connecting part connecting the spring sections.

6. The electric toothbrush head according to claim 5, wherein the swing arm is provided on the two sides of front end portion of the swing arm with notches for embedding the spring sections and recesses extending from the front end portion of the swing arm to a rear end portion to guide two sides of the notches for embedding the connecting part.

7. The electric toothbrush head according to claim 6, wherein two sides of each of the notches are provided with positioning posts cooperating with inner holes of the spring sections.

8. The electric toothbrush head according to claim 6, wherein a front end face of the swing arm is provided with an anti-rotation slot, and a tail of the drive shaft has a step;

when the drive shaft is fixedly inserted into the anti-rotation slot of the swing arm, the step is constructed to press against the connecting part of the integral balance spring.

9. The electric toothbrush head according to claim 8, wherein the swing arm is correspondingly provided with an exhaust hole connected to a rear end of the anti-rotation slot, and an extension axis of the exhaust hole is parallel or perpendicular to an extension axis of the anti-rotation slot.

10. The electric toothbrush head according to claim 5, wherein a front end face of the swing arm is provided with an anti-rotation slot, and a tail of the drive shaft has a step;

when the drive shaft is fixedly inserted into the anti-rotation slot of the swing arm, the step is constructed to press against the connecting part of the integral balance spring.

11. The electric toothbrush head according to claim 10, wherein the swing arm is correspondingly provided with an exhaust hole connected to a rear end of the anti-rotation slot, and an extension axis of the exhaust hole is parallel or perpendicular to an extension axis of the anti-rotation slot.

12. The electric toothbrush head according to claim 4, wherein the elastic reset components on the two sides are fixedly connected with balancing members, and opposite side walls of the mounting chamber are correspondingly provided with guide fixing grooves for embedding the balancing members.

13. The electric toothbrush head according to claim 12, wherein each of the guide fixing grooves is provided with a balance member rib corresponding to a front slot wall, the balance member rib and a front end of each of the guide fixing grooves cooperate to form a limiting placement area for limiting a placement of the balancing members, a front wall surface of the balance member rib is tangent to an outer surface of each of the balancing members, and a rear wall surface of the balance member rib is a sloped or curved structure for guiding the balancing members to slide in.

14. The electric toothbrush head according to claim 1, wherein a front end portion of the drive shaft is provided with a bent segment arranged in the swinging slot, and the tufted block is driven to swing left and right by the bent segment contacting corresponding opposite inner walls of the swinging slot.

15. The electric toothbrush head according to claim 1, further comprising a fixation sleeve, the fixation sleeve is fixedly mounted inside a rear end portion of the mounting chamber to lock the swing arm in place within the mounting chamber.

16. The electric toothbrush head according to claim 1, wherein a cross-sectional shape of the at least one guide protrusion is circular, elliptical, triangular, or trapezoidal.

17. The electric toothbrush head according to claim 1, wherein the guide groove is helical, sloped, or arc-shaped.

18. The electric toothbrush head according to claim 1, wherein the at least one guide protrusion is integrally connected to the tufted block, or the at least one guide protrusion is a separate component mounted on the tufted block.

* * * * *